United States Patent
Brundidge et al.

(10) Patent No.: US 10,372,436 B2
(45) Date of Patent: Aug. 6, 2019

(54) SYSTEMS AND METHODS FOR MAINTAINING OPERATING CONSISTENCY FOR MULTIPLE USERS DURING FIRMWARE UPDATES

(71) Applicant: Lenovo Enterprise Solutions (Singapore) Pte. Ltd., New Tech Park (SG)

(72) Inventors: Jimmie Lee Brundidge, Raleigh, NC (US); John Joseph Hedderman, Raleigh, NC (US); Shekhar Joshi, Raleigh, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 15/673,886

(22) Filed: Aug. 10, 2017

(65) Prior Publication Data

US 2019/0050216 A1   Feb. 14, 2019

(51) Int. Cl.
| | |
|---|---|
| *G06F 9/445* | (2018.01) |
| *G06F 17/30* | (2006.01) |
| *G06F 8/65* | (2018.01) |
| *G06F 16/23* | (2019.01) |
| *G06F 16/25* | (2019.01) |
| *H04L 29/08* | (2006.01) |
| *G06F 15/173* | (2006.01) |

(52) U.S. Cl.
CPC ............ *G06F 8/65* (2013.01); *G06F 16/2365* (2019.01); *G06F 15/173* (2013.01); *G06F 16/258* (2019.01); *H04L 67/34* (2013.01)

(58) Field of Classification Search
CPC .... G06F 8/65; G06F 17/30371; G06F 15/173; G06F 16/2365; G06F 16/245; G06F 16/258; H04L 67/34
USPC ........................................................ 717/168
See application file for complete search history.

(56) References Cited

U.S. PATENT DOCUMENTS

2009/0100165 A1*  4/2009  Wesley, Sr. et al. ...... G06F 8/65
                                                             709/223

\* cited by examiner

*Primary Examiner* — Wei Y Zhen
*Assistant Examiner* — Mohammed N Huda
(74) *Attorney, Agent, or Firm* — Olive Law Group, PLLC

(57) ABSTRACT

Systems and methods for maintaining operating consistency for multiple users during firmware updates. According to an aspect, a method includes receiving, at a predetermined time interval, a request from one or more users of an application to carry out a result on a computing device. The method also includes analyzing a plurality of sessions of the application on the computing device servicing one or more users. The method also includes determining if one of the plurality of sessions contains an updated data. Further, the method includes creating at least one of a plurality of consistency groups based on the updated data. Further, the method includes updating, after the predetermined time interval, the application based on the at least one of the plurality of consistency groups.

16 Claims, 7 Drawing Sheets

```
┌─────────────────────────────────────────────────────────────────────┐
│ RECEIVE, AT A PREDETERMINED TIME INTERVAL, A REQUEST FROM ONE OR MORE│
│    USERS OF AN APPLICATION TO CARRY OUT A RESULT ON A COMPUTING DEVICE│
│                                 200                                  │
└─────────────────────────────────┬───────────────────────────────────┘
                                  ▼
┌─────────────────────────────────────────────────────────────────────┐
│   ANALYZE A PLURALITY OF SESSIONS OF THE APPLICATION ON THE COMPUTING│
│                  DEVICE SERVICING ONE OR MORE USERS                  │
│                                 202                                  │
└─────────────────────────────────┬───────────────────────────────────┘
                                  ▼
┌─────────────────────────────────────────────────────────────────────┐
│     DETERMINE IF ONE OF THE PLURALITY OF SESSIONS CONTAINS AN UPDATED│
│                                 DATA                                 │
│                                 204                                  │
└─────────────────────────────────┬───────────────────────────────────┘
                                  ▼
┌─────────────────────────────────────────────────────────────────────┐
│  CREATE AT LEAST ONE OF A PLURALITY OF CONSISTENCY GROUPS BASED ON THE│
│                             UPDATED DATA                             │
│                                 206                                  │
└─────────────────────────────────┬───────────────────────────────────┘
                                  ▼
┌─────────────────────────────────────────────────────────────────────┐
│  UPDATE, AFTER THE PREDETERMINED TIME INTERVAL, THE APPLICATION BASED│
│         ON THE AT LEAST ONE OF THE PLURALITY OF CONSISTENCY GROUPS   │
│                                 208                                  │
└─────────────────────────────────────────────────────────────────────┘
```

SYSTEMS AND METHODS FOR MAINTAINING OPERATING CONSISTENCY FOR MULTIPLE USERS DURING FIRMWARE UPDATES

TECHNICAL FIELD

The presently disclosed subject matter relates to the maintenance of operating consistency for computing devices. More particularly, the presently disclosed subject matter relates to systems and methods for maintaining operating consistency for multiple users during firmware updates.

BACKGROUND

Modern applications often host many users at any moment in time wherein the users are simultaneously viewing the applications' data. At any of those moments, these users can actively work on the data within these applications without being aware of one other and the corresponding changes being done by each of them. In an example, multiple users can be working on a certain webpage at some point in time. As the users view this webpage and make changes to it, there will a constant flow of events stemming from each user. However, a potential issue arises wherein the operations coming from these flow of events, which denote the users' changes, become segregated from each other and are not processed in a manner that would allow all of the changes to be properly reflected on the webpage. This is problematic because the webpage now has an incomplete set of changes since it may not be accurately and fully reflecting all of the users' changes in a timely manner. The webpage may reflect some of these changes, but it may be doing so at various different times that can cause the webpage to be out of sync with the users' changes. As a result, invalid data can occur due to this uncoordinated update to the webpage, thus affecting the users' ability to properly work on the webpage since they are working from an invalid data set that can become outdated.

In addition, current applications operate on a push protocol wherein changes are pushed onto the system. This is inefficient because it requires the system to constantly process these changes when it may not have the available resources to do so or even if it does, such resources can be put to better use for another purpose. Indeed, if the system does not have to constantly process these changes, its processing speed and operating efficiency can be greatly increased since it could focus on other pertinent operations. This problem is further magnified when a multitude of applications are being used and operated on because those lost resources get compounded.

Returning to the webpage example above, a push protocol would necessitate a constant push of changes onto the webpage. This can occur when the users are not ready for the changes to be made onto the webpage yet since they desire for their changes to be bundled together in a packet that can then be updated at once during a particular time period. However, under the push protocol, this cannot happen. As such, snippets of these changes are being pushed onto the webpage when it would be more efficient to hold onto them until the user is ready for them to go into effect.

Therefore, another solution is needed that can allow users to request, i.e. pull, the packet of changes for the application at only certain time periods rather than having the packet of changes automatically pushed onto the application and that such a packet be reflective of the changes made by the various users of the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein systems and methods for maintaining operating consistency for multiple users during firmware updates. According to an aspect, a method includes receiving, at a predetermined time interval, a request from one or more users of an application to carry out a result on a computing device. The method also includes analyzing a plurality of sessions of the application on the computing device servicing one or more users. Further, the method includes determining if one of the plurality of sessions contains an updated data. The method also includes creating at least one of a plurality of consistency groups based on the updated data. Further, the method includes updating, after the predetermined time interval, the application based on the at least one of the plurality of consistency groups.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 2 is a flowchart of an example method for implementing systems and methods for maintaining operating consistency for multiple users during firmware updates in accordance with embodiments of the present disclosure.

DETAILED DESCRIPTION

Figure 1:
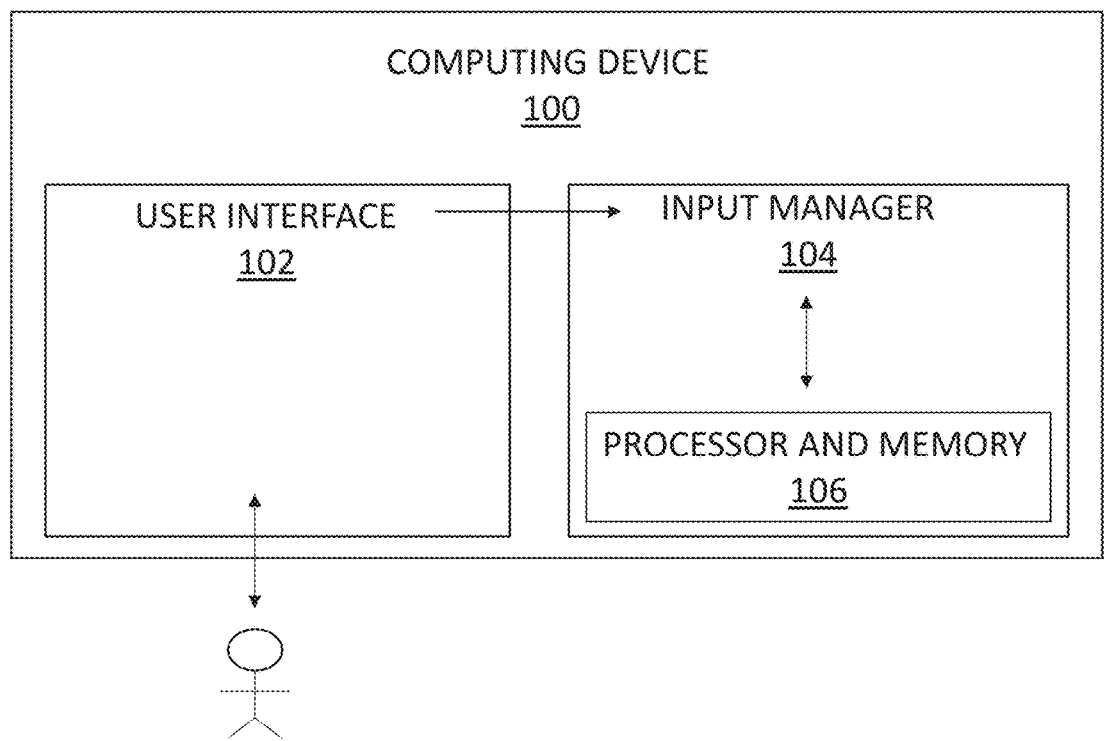
FIG. 1 is a block diagram of an example system for systems and methods for maintaining operating consistency for multiple users during firmware updates in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Modern applications often host may users at any moment in time wherein the users are simultaneously viewing the applications' data and content. At any of those moments, these users can actively work on the data within these applications without being aware of one other and the corresponding changes being done by each of them. Thus, a solution is needed wherein a user session can receive page updates for the application based on every session action at a predetermined polling cycle period. Furthermore, the sessions must remain in sync with each other during this time period to ensure that the updated data changes are accurately reflected in the application. Therefore, it is desirable to create a consistency group that contains the session's page update data for a user to pull allowing each session to receive the same content regarding data updates during a particular polling cycle period.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. A computing device may be, for example, a server. In another example, a computing device may be any type of conventional computer, such as a laptop computer or a tablet computer or a desktop computer. In another example, the computing device may be a type of network device such as a router or a switch. In another example, the computing device may be a smart television or a high definition television. In another example, the computing device may be a battery powered Internet of Things (IoT) device. In another example, the computing device may be a video disc player (e.g. BLU-RAY DISC®, BLU-RAY 3-D®, or the like). In another example, a computing device may be a mobile computing device such as, for example, but not limited to, a smart phone, a cell phone, a pager, a personal digital assistant (PDA), a mobile computer with a smart phone client, or the like. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on servers in a datacenter, the examples may similarly be implemented on any suitable computing device or computing devices.

In accordance with the embodiments, the present disclosure provides systems and methods for maintaining operating consistency for multiple users during firmware updates. For example, FIG. 1 illustrates a block diagram of an example system for systems and methods for maintaining operating consistency for multiple users during firmware updates. Referring to FIG. 1, the system includes a computing device 100 that may contain a user interface 102, an input manager 104, and a processor and memory 106. The computing device 100 may be any suitable computer such as a laptop computer, a tablet computer, or a desktop computer. In another example, the computing device 100 may be a mobile computing device. In another example, the computing device may be a type of network device such as a router or a switch. In another example, the computing device 100 may be a server. In yet another example, the computing device 100 may be a smart television or a high definition television or a video disc player (e.g. BLU-RAY DISC®, BLU-RAY 3-D®, or the like). In yet another example, the computing device may be a battery powered Internet of Things (IoT) device. The computing device 100 may include a user interface 102, such as a display (e.g., touchscreen display), a touchpad, and/or the like. The input manager 104 may receive a set of inputs from the user interface 102 for processing by the processor and memory 106. The input manager 104 may be implemented by hardware, software, firmware, or combinations thereof. The user interface 102 and input manager 104 can be used to put in a request to the processor and memory 106 on the computing device 100. In an example, the request can be for updated data of the application.

FIG. 2 illustrates a flowchart of an example method for systems and methods for maintaining operating consistency for multiple users during firmware updates in accordance with embodiments of the present disclosure. The method of FIG. 2 is described by example as being implemented by the computing device 100 shown in FIG. 1, although it should be understood that the method may be implemented by any suitable computing device(s). Additionally, reference is also made to the flowchart shown in FIG. 3, which is described in further detail herein in accordance with embodiments of the present disclosure.

Referring to FIG. 2, the method includes receiving 200, at a predetermined time interval, a request from one or more users of an application to carry out a result on a computing device 100. The computing device 100 may contain at least one of a processor and memory 106 and an input manager 104 that accepts inputs from a user interface 102. In an example, the user may make a request for the updated data via the user interface 102 of a computing device 100 such as a server. In an example, a result on the computing device 100 is a firmware update of the application. In another example, a result on the computing device 100 is a page update of the application.

The method of FIG. 2 also includes analyzing 202 a plurality of sessions of the application on the computing device 100 servicing one or more users. The analysis is done for a plurality of active sessions of the application, i.e. sessions where users are working on the data within the session. In an example, an active session comprises of a master session and at least one of a follower session.

Figure 3:
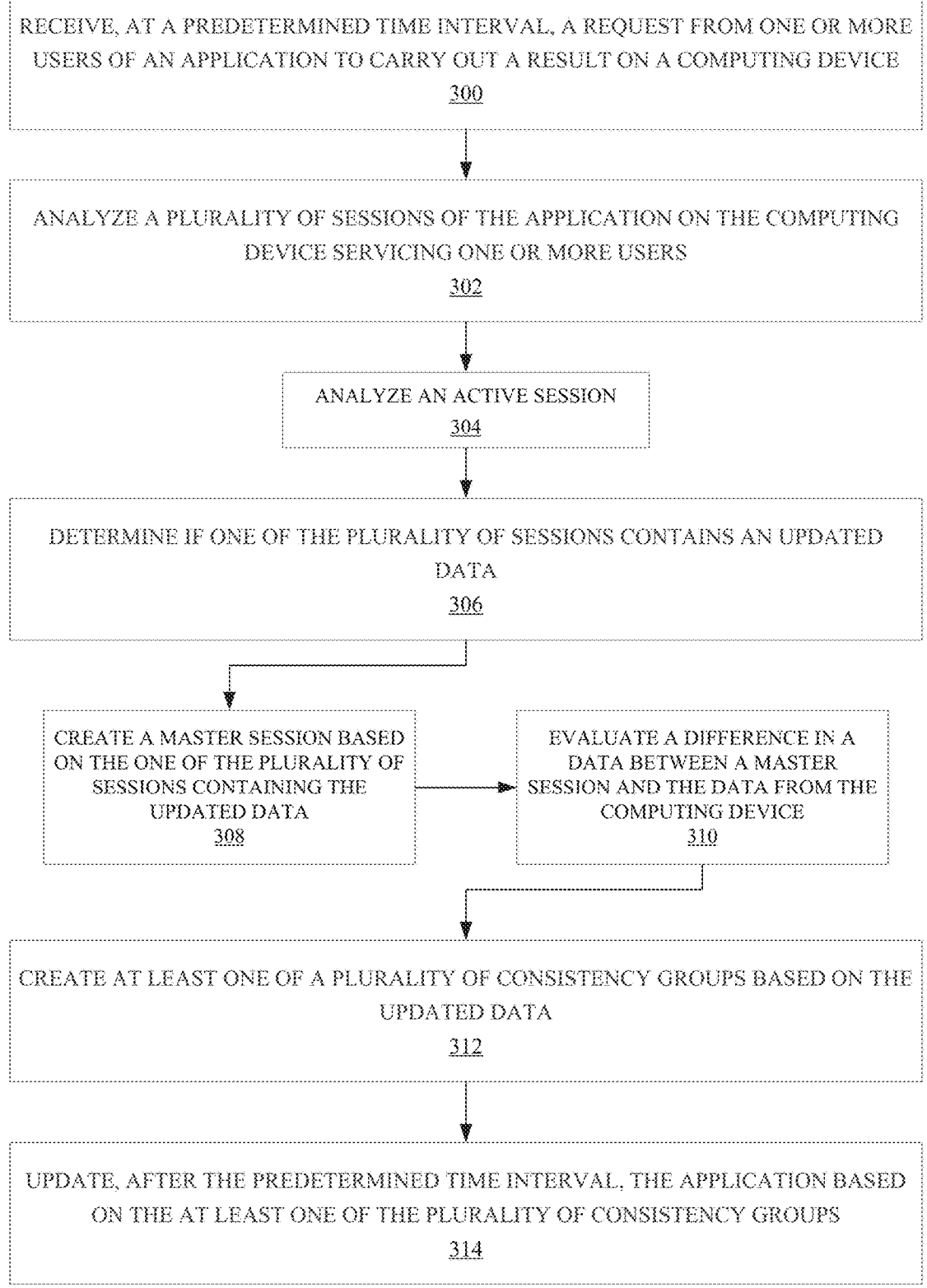
FIG. 3 is a flowchart of an example method for analyzing a plurality of sessions of the application on the computing device servicing one or more users and determining if one of the plurality of sessions contains an updated data in accordance with embodiments of the present disclosure.

The method of FIG. 2 also includes determining 204 if one of the plurality of sessions contains an updated data. In an example, the processor and memory 106 examines the plurality of sessions and determines if one of these sessions contains an updated data, such as a request from a user for updated data. FIG. 3, as subsequently described, illustrates the determining step 204 in further detail. Returning to FIG. 2, the method then includes creating 206 at least one of a plurality of consistency groups based on the updated data. The plurality of the consistency groups comprises of creating a master session and at least one of a follower session.

In an example, the consistency group contains the page update data of an application that each user is working on, thus allowing each session for the multiple users to receive the same content during a session polling cycle. The consistency group serves as a group or a compilation of the user session's page update data, with each session in the consistency group having a master session. Essentially, the consistency group is a bundle of changes pulled at one time. Thus, whichever session gets its request to the engine first becomes the master session and the others become follower sessions since all changes are sent to one session master which then governs all other session at the same time. The master session determines the page update data to be surfaced to the various sessions during a session polling cycle. This data from the master session is then saved for follower sessions to consume, i.e. use. Hence, the follower sessions will surface any data to the user's application that the master session has also surfaced. This cycle continues while the users remain on the application's page. As such, there can be a plurality of consistency groups. This is a more user driven process since it is based on a session making a request for updated data. Thus, as changes occur in the database of an application, that change is recognized and a consistency group is created to hold onto that group of change for a predetermined amount of time before it is given back to the application in order to update the user session at that predetermined time.

Expanding further on the preceding example, let us say that there are three sessions with Users A, B, and C. Each user has a chassis, i.e. an enclosure that has multiple servers inside it, that the user wishes to apply, in an example, firmware updates to an application. The firmware apply page will display all three chassis (Chassis A, B, and C) for the three users, respectively. However, each user is applying firmware updates to their own respective chassis. As the updates are being applied, each user session will poll, i.e. check with, the engine to determine if any updates are applied successfully. As newly modified data are discovered, they get saved in the engine until a session requests the data. Let us say that one of the sessions, say session X out of sessions X, Y, and Z, makes a request for the data and that session X finds and obtains this modified data. Session X is then designated the master session since it has the modified data and its data is then used to create a consistency group. Session X's data is also saved for consumption by the follower sessions, i.e. Sessions Y and Z.

Returning now to the method of FIG. 2, the method further includes updating 208, after the predetermined time interval, the application based on the at least one of the plurality of consistency groups. The at least one of the plurality of consistency groups is used to keep the plurality of sessions in sync with one another so that a user receives the same content for data updates via the computing device 100 during a particular polling cycle period. This ensures that updates will be accurately reflected for the multiple users of an application. Moreover, the at least one of the plurality of consistency groups also manages a processing and a presenting of the updated data to the at least one of the plurality of sessions. That is, the consistency group processes the updated data as well as presents the updated data to one or more sessions.

Referring now to FIG. 3, this figure illustrates a flowchart of an example method for determining 306 if one of the plurality of sessions contains an updated data, as well as an example method for analyzing 302 a plurality of sessions of the application on the computing device 100 servicing one or more users. Initially, the method includes receiving 300, at a predetermined time interval, a request from one or more users of an application to carry out a result on a computing device 100. The method further includes analyzing 302 a plurality of sessions of the application on the computing device 100 servicing one or more users. The method then includes analyzing 304 an active session. The method further includes determining 306 if one of the plurality of sessions contains an updated data. The method then includes creating 308 a master session based on the one of the plurality of sessions containing the updated data. That is, a session that contains the updated data becomes a master session. In an example, the updated data can be a request for data as initiated by a user via the user interface 102 and input manager 104 of the computing device 100.

In an example, a master session is created when a list of data to be sent to a user interface 102 of the computing device 100 at a predetermined time interval is determined to contain updated data. The master session is created from the updated data and the updated data from the master session is saved for consumption, i.e. use, by at least one of a follower session to carry out the result on the computing device 100.

The method of FIG. 3 also includes evaluating 310 a difference in a data between a master session and the data from the computing device 100. The method further includes creating 312 at least one of a plurality of consistency groups based on the updated data. In an example, a comparator performs the evaluation 310 and then creates 312 the consistency group based on the difference between the master session and the data from the computing device 100. In an example, the data from the computing device 100 is server data.

The method of FIG. 3 further includes updating 314, after the predetermined time interval, the application based on the at least one of the plurality of consistency groups. The consistency group is a group of an individual session's update data wherein each session has a master and at least one follower session. A master session determines the updated data to be surfaced each session during the session polling cycle period and the follower sessions surface any data that the master session has surfaced, hence the term "follower". Essentially, the master session determines the updated data to present to one of a plurality of sessions and the follower session follows the master session. This process continues while users remain on the page of the application. In an example, the follower makes a request for the updated data from a master session. The request is then granted and the follower session obtains the updated data from the master session and consumes, i.e. use, the updated data to carry out the result on the computing device 100.

Referring again to FIG. 3 and the analysis 304 of an active session, the method has to determine whether the session is active or inactive. In an example, an inactive session is one that contains a predetermined threshold amount of consistency groups. For instance, if the threshold amount is five, then a session that contains five consistency groups is deemed to be inactive because it has been accumulating the consistency groups rather than using them to update the application. Hence, the session is placed on inactive status and is not used for the analysis 304 and subsequent determination 306 if one of the plurality of sessions contains an updated data in order to create 312 at least one of the plurality of consistency groups.

Once it has been determined that a session is on inactive status and has been so for some predetermined amount of time, then once the session becomes active again, the entire application is updated rather than using the at least one of the plurality of consistency groups to update the application. This is done for efficiency and expediency because the session may have been inactive for a long period of time, and in which case, it would accumulate a large number of consistency groups. In an example, it may accumulate twenty consistency groups. In this case, it would be better to update the entire page of the application upon the session's return to active status rather than updating using the twenty consistency groups because it is more efficient to do so. This would save the processor and memory 106 from having to perform more operations than necessary.

Referring again to FIG. 3 and the creation 308 of a master session based on the one of the plurality of sessions containing the updated data, the method has to account for when a master session leaves the application. In an example, an initial master session leaves the application, i.e. goes on an inactive status. Then, a follower session makes a request for the updated data from at least one of the plurality of consistency groups. If it is determined that at least one of the plurality of consistency groups contains some updated data, then the follower session making the request is promoted to become a new master session. The updated data from this newly promoted master session is then saved for consumption, i.e. use, by at least one of another follower session to carry out the result on the computing device 100. If the initial master session returns to the application, then it will be relegated to a status as another follower session.

Figure 4:
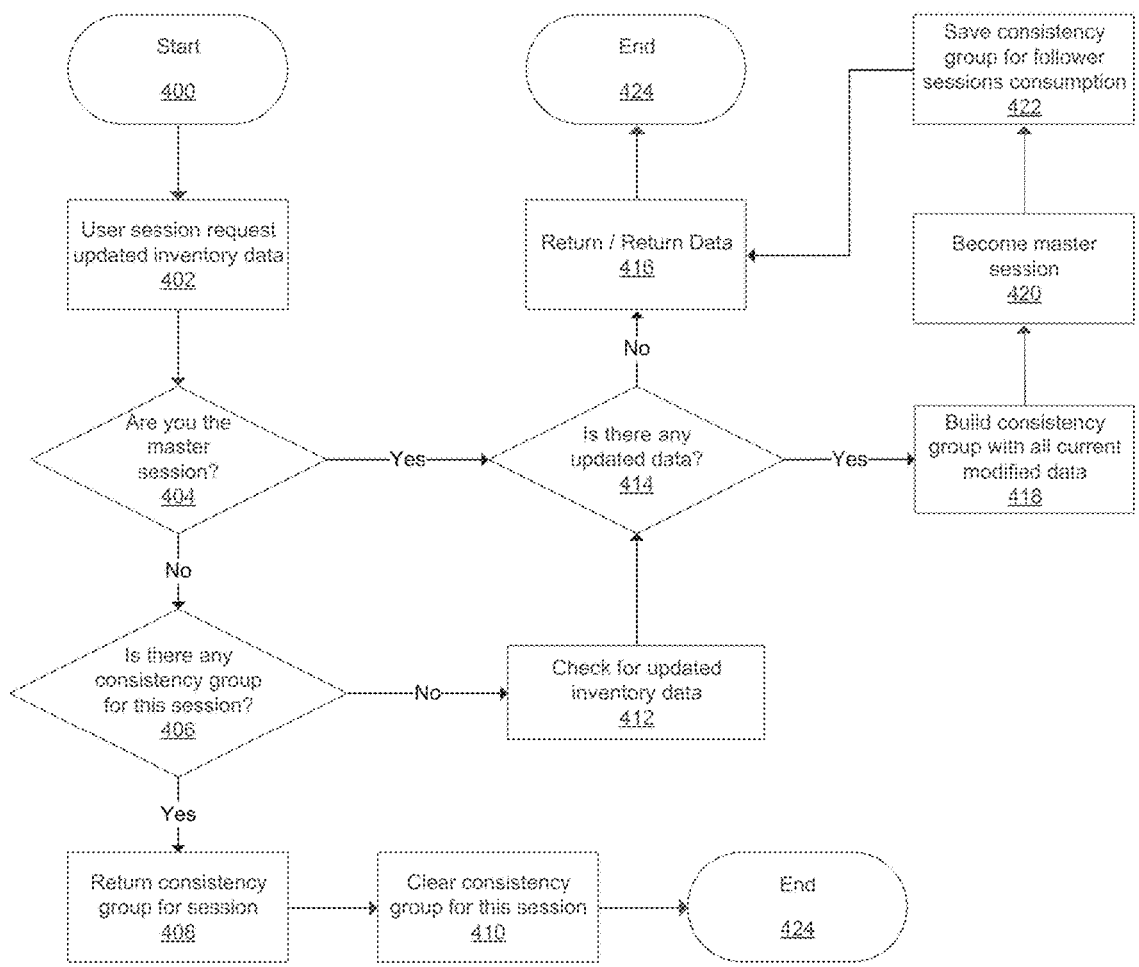
FIG. 4 is a high-level flowchart depicting a request for a consistency group in accordance with embodiments of the present disclosure.

FIG. 4 provides a high-level flowchart depicting a request for and creation 206, 312 of a consistency group in accordance with embodiments of the present disclosure. The process starts 400 with a request 402 from a user session of a computing device 100 for, in an example, updated inventory data. It is then determined 404 whether the session making the request is a master session. If yes, then it is determined whether there is any updated data 414. If the answer to step 414 is yes, then a consistency group is built 418 with all of the current modified data. This consistency group then becomes 420 a master session and data from it is saved 422 for follower sessions to consume. From there, the processor and memory 106 returns 416 the data and the process ends 424. If the answer to step 414 is no, then the processor and memory 106 returns 416 the data and the process ends 424.

Still referring to FIG. 4, if the answer to the determination 404 step is no, then a different determination is made to see if there is any consistency group for this session 406. If the answer is yes, then the processor and memory 106 returns the consistency group for the session 408 followed by a clearing 410 of the consistency group for this session and an ending 424 of the process. If the answer to step 406 is no, then the processor and memory 106 checks 412 for, in an example, updated inventory data. This is then followed by the 414 step and its subsequent process flow, as already described above.

Figure 5:
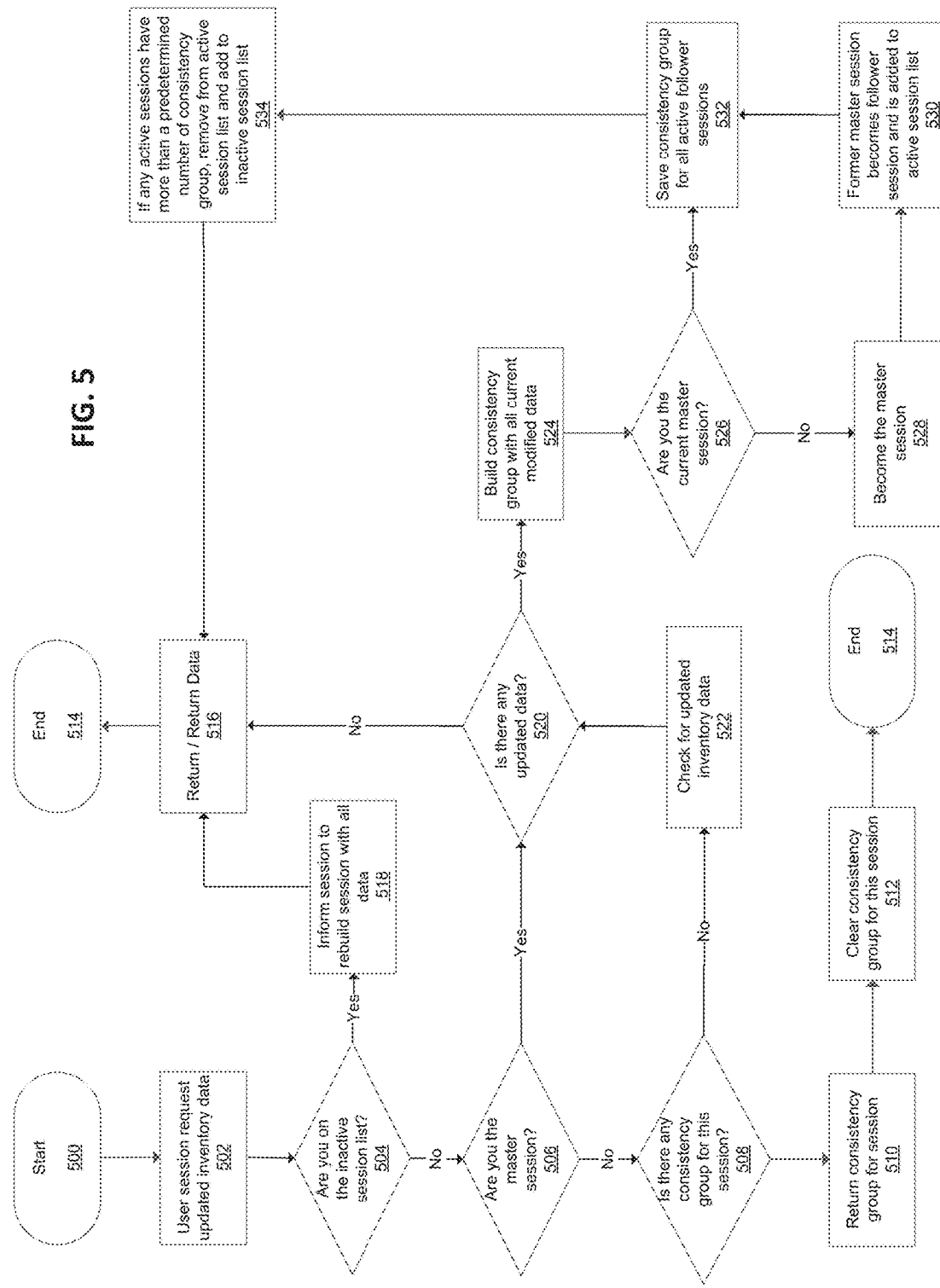
FIG. 5 is a high-level flowchart depicting a consistency group session management in accordance with embodiments of the present disclosure.

FIG. 5 is a high-level flowchart depicting a consistency group session management in accordance with embodiments of the present disclosure. Steps 500, 502, 506, 508, 510, 512, 514, 516, 520, 522, and 524 are the same as was previously described in FIG. 4. Here, when the process starts 500 and the user session makes a request 502 for, in an example, updated inventory data, the process then determines whether the session is on the inactive session list 504. If yes, then the session is informed 518 that it needs to be rebuilt using all of the data obtained while it was on inactive status followed by a return 516 of the data and the ending 514 of the process. If the answer to step 504 is no, then it is determined whether the session making the request is a master session 506, followed by step 506's subsequent process flow. Jumping forward in the process, when it is determined that there is updated data 520, then a consistency group is built 524 with all of the current modified data. After that, a different determination is made regarding whether the consistency group containing all of the current modified data is a current master session 526. If yes, then the data from the consistency group is saved 532 for all active follower sessions to consume. This is followed by an evaluation that if any active sessions have more than 534 a predetermined number of consistency groups, then that active session is removed 534 from the active session list and added 534 to the inactive session list. This is because an active session would be using the consistency groups to update the page of an application rather than accumulating them. Hence, if a session accumulates, in an example, five consistency groups or more, then it is inactive and must consequently be placed 534 into the inactive status. From there, the processor and memory 106 returns 516 the data and the process ends 514.

Still referring to FIG. 5, if the answer to the step 526 is no, then this consistency group has to become 528 a master session while a previous or former 530 master session becomes a follower session. This is because the former master session does not contain any updated data and thus, is relegated to a status as a follower session. Since these sessions are active sessions, they must be added 530 to the active session list. Then, the updated data from the consistency group is saved 532 for all the follower sessions to consume. The process then continues with steps 534, 516, and 514 as was previously described.

Figure 6:
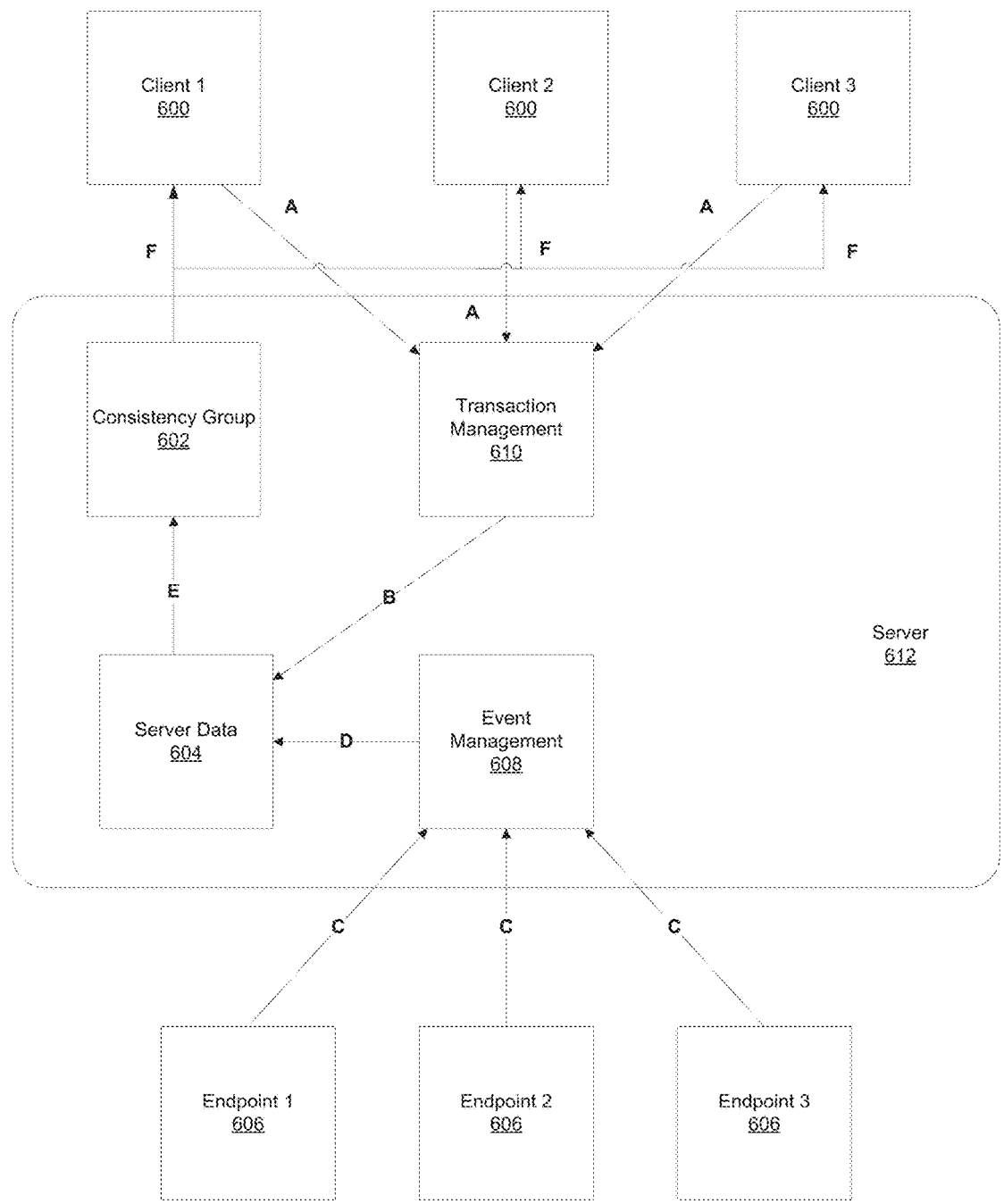
FIG. 6 is an example transaction flow in accordance with embodiments of the present disclosure.

Examples that can embody the presently disclosed subject matter are now described in more detail. FIG. 6 depicts an example transaction flow in accordance with embodiments of the present disclosure. Client 1, 2 and 3 600 each represent a client interface for a user of a computing device 100. A user via the client interface 600 engages the user interface 102 which then interacts with an input manager 104 of a computing client 100 to initiate a request to, in an example, a server 612 as denoted by A. Such a request may be, for example, updated data. This request from the client 600 is sent to the transaction management 610 component of the server 612 for processing. This request is processed and the server data 604 is updated based on the request as denoted by B. In an example, the server data 604 can be a local cache server data. The endpoint 1, 2 and 3 606 represent actions that can be undertaken. The endpoint 606 can post an event regarding any change in the endpoint data to the event management component 608 of the server 612 as denoted by C. The event management 608 component of the server 612 can process the events, as received from the endpoint 606, and post any observed changes to the local cache server data 604 as denoted by D. In an example, a comparator is used to evaluate the data received from the transaction management 610 component and the event management 608 component to determine whether there is a difference between those server data sets 604. Differences between those two server data sets 604 are then used to create a consistency group 602 as denoted by E. Data from the consistency group 602 is then subsequently consumed, i.e. used, by the client 600 to update the client application as denoted by F.

Figure 7:
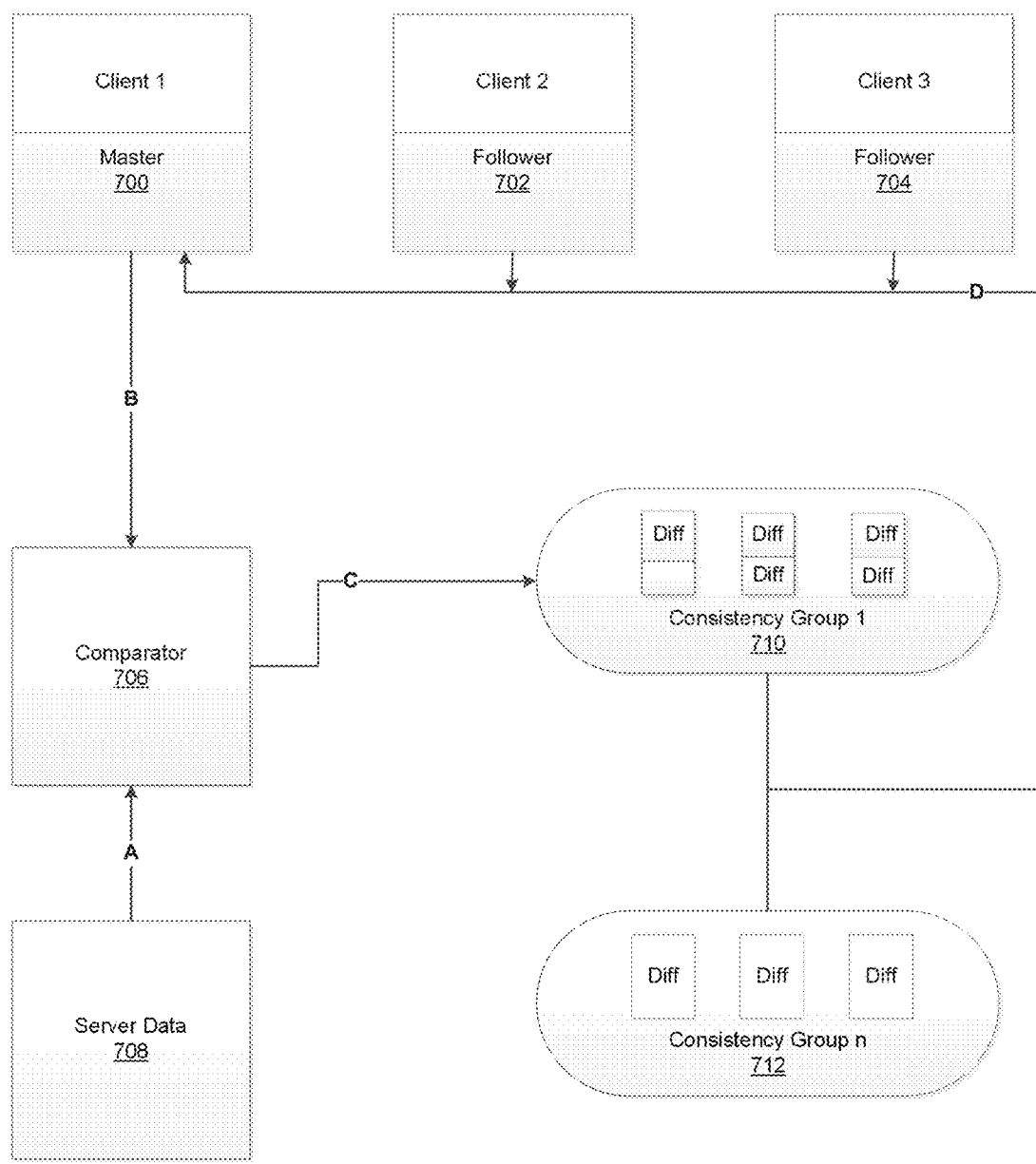
FIG. 7 is an example consistency group management flow in accordance with embodiments of the present disclosure.

FIG. 7 depicts an example consistency group management flow in accordance with embodiments of the present disclosure. Similar to FIG. 6, client 1, 2 and 3 each represent a client interface for a user of a computing device 100. A user via the client interface engages the user interface 102 which then interacts with an input manager 104 of a computing client 100 to initiate a request, in an example, for updated data. Here, there is a distinction between the various clients. Specifically, client 1 700 is the master session, while client 2 702 and client 3 704 each represent different follower sessions. Client 1 700 is a master session because it is making a request for, in an example, updated data. The data from client 1 700 is fed into, in an example, a comparator 706 to be compared against data obtained from the server, i.e. server data 708, as denoted by B and A, respectively. The server data 708 is fed into the comparator 706 after each modification of the server, again as denoted by A. The comparator 706 performs an evaluation of the two sets of data obtained from client 1 700 and the server 708 and then constructs a consistency group 710 based on the differences between the two data sets. This is denoted by C. Multiple consistency groups, i.e. consistency group n 712, can be created when a session becomes inactive. In an example, a follower session may become inactive, but the master session will still be creating consistency groups during this period of time. Since the follower session is inactive, it accumulates these consistency groups so that when it comes back to active status, the follower session can use these consistency groups to update the data. Indeed, data from the consistency groups 710, 712 are posted to each client 700, 702, 704 for its respective use, as denoted by D.

Still referring to FIG. 7, more than one consistency group 710, 712 can operate at the same time since they are constructed based off the master session. Consistency groups 710, 712 are given to all follower sessions so that they can follow the master session and consume the data to update the application. The data from consistency groups 710, 712 are also consumed by the master session. Each consistency group 710, 712 will have its own master session though. A consistency group 710, 712 is different than a session. Specifically, a consistency group 710, 712 is an entity that contains all of the differences between, in an example, an application data and the master session data. In contrast, a session is one user's view of the application data, such as a web page.

Still referring to FIG. 7, as was previously stated, more than one consistency group 710, 712 can exist since they are created based off the master session and are consumed by all sessions. Thus, in an example, if a session navigates away from the page of the application or does not make a request for an updated data during a predetermined time interval, then the session will be placed in an inactive session category. While in the inactive session category, consistency groups 710, 712 will still be constructed for the inactive session. These consistency groups 710, 712 will be placed in a queue until the session becomes active again, thereby resulting in multiple consistency groups since a new master session can rule during the time that the session is inactive.

While multiple consistency groups 710, 712 may be present, they are not aware of one another. Thus, they do not act together. They are their own entity that contains all of the differences in data at a predetermined time interval based on the master session. In contrast, a session represents just one user's view of the data. In an example, a session would be representing only the view of data from client 1 700, client 2 702, or client 3 704. The driving factor behind consistency groups 710, 712 is to allow each session to possess a consistent view of the data. Consistency groups 710, 712 are provided to the session based on the session's predetermined time interval. As such, it is possible that each session is not updated at the same time. Regarding the application on a computing device 100, the application data is updated before a consistency group 710, 712 is made. In an example, the consistency group 710, 712 serves to provide differences between the application data and the session's view of the data. If multiple consistency groups 710, 712 exist for a session, then the session will consume the consistency groups 710, 712 in the order that they were created.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
receiving, at a predetermined time interval, a request from one or more users of an application to carry out a result on a computing device;
analyzing a plurality of sessions of the application on the computing device servicing one or more users;
determining if one of the plurality of sessions contains an updated data;
creating at least one of a plurality of consistency groups based on the updated data;
updating, after the predetermined time interval, the application based on the at least one of the plurality of consistency groups;
leaving the application by an initial master session;
requesting, by a follower session, for the updated data from the at least one of the plurality of consistency groups;
determining if the at least one of the plurality of consistency groups contains the updated data;
in response to determining that the at least one of the plurality of consistency groups contains the updated data, promoting the follower session to become a new master session;
saving the updated data from the new master session for consumption by at least one of another follower session to carry out the result on the computing device; and
relegating the initial master session to a status as one of the other follower session upon a return of the initial master session into the application.

2. The method of claim 1, wherein the computing device comprises at least one of a processor and memory and a user interface.

3. The method of claim 1, wherein the plurality of sessions comprises of a master session and the at least one of a follower session.

4. The method of claim 1, wherein the result on the computing device comprises one of a firmware update and a page update.

5. The method of claim 1, wherein analyzing a plurality of sessions comprises analyzing an active session.

6. The method of claim 1, wherein determining if one of the plurality of sessions contains the updated data comprises creating a master session based on the one of the plurality of sessions containing the updated data.

7. The method of claim 1, wherein determining if one of the plurality of sessions contains the updated data comprises of evaluating a difference in a data between a master session and the data from the computing device.

8. The method of claim 1, wherein creating the at least one of the plurality of consistency groups comprises of creating a master session and at least one of a follower session.

9. The method of claim 1, wherein updating the application based on the at least one of the plurality of consistency groups comprises having the at least one of the plurality of consistency groups keep the plurality of sessions in sync with one another.

10. The method of claim 1, wherein updating the application based on the at least one of the plurality of consistency groups comprises having the at least one of the plurality of consistency groups manage a processing and a presenting of the updated data to the at least one of the plurality of sessions.

11. The method of claim 1, further comprising:
creating a list of data to be sent to a user interface of the computing device at the predetermined time interval;
determining whether the list of data contains the updated data;
in response to determining that the list contains the updated data, creating a master session; and
saving the updated data from the master session for consumption by at least one of a follower session to carry out the result on the computing device.

12. The method of claim 1, further comprising:
receiving, at the predetermined time interval, a request from at least one of a follower session for the updated data from a master session;
obtaining, by at least one of the follower session, the updated data from the master session; and
consuming the updated data by at least one of the follower session to carry out the result on the computing device.

13. The method of claim 1, further comprising:
determining if a session contains a threshold of consistency groups;
in response to determining that the session contains the threshold of consistency groups, removing the session from an active session status; and
placing the session on an inactive session status.

14. The method of claim 1, further comprising:
determining if a session is on an inactive session status for a predetermined amount of time; and
in response to determining that the session is on the inactive session status for the predetermined amount of time, updating an entire application upon a return of the session to an active session status rather than updating based on the at least one of the plurality of consistency groups.

15. The method of claim 1, further comprising;
determining by a master session of the updated data to present to the one of the plurality of sessions; and
following of the master session by at least one of a follower session.

16. A computing device comprising:
a user interface; and
an input manager comprising at least one of a processor and memory to:
receive, at a predetermined time interval, a request from one or more users of an application to carry out a result on a computing device;
analyze a plurality of sessions of the application on the computing device servicing one or more users;
determine if one of the plurality of sessions contains an updated data;
create at least one of a plurality of consistency groups based on the updated data;
update, after the predetermined time interval, the application based on the at least one of the plurality of consistency groups;
leave the application by an initial master session;
request, by a follower session, for the updated data from the at least one of the plurality of consistency groups;
determine if at least one of the plurality of consistency groups contains the updated data;
in response to determining that the at least one of the plurality of consistency groups contains the updated data, promote the follower session to become a new master session;
save the updated data from the new master session for consumption by at least one of another follower session to carry out the result on the computing device; and
relegate the initial master session to a status as one of the other follower session upon a return of the initial master session into the application.

* * * * *